US009307615B2

(12) United States Patent
Civiello et al.

(10) Patent No.: US 9,307,615 B2
(45) Date of Patent: Apr. 5, 2016

(54) FIELD SELECTABLE CONTACTOR CONTROL MODULES

(71) Applicant: General Electric Company, Schenectady, NY (US)

(72) Inventors: Daniel E. Civiello, Plainville, CT (US); David James Lesslie, Plainville, CT (US); Craig Benjamin Williams, Louisville, KY (US); Jeyaprakash Kandasamy, Hyderabad (IN); Babu Chinnasamy, New Britain, CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/333,684

(22) Filed: Jul. 17, 2014

(65) Prior Publication Data

US 2016/0021719 A1    Jan. 21, 2016

(51) Int. Cl.
*H05B 37/02* (2006.01)
*H02J 4/00* (2006.01)

(52) U.S. Cl.
CPC .. *H05B 37/02* (2013.01); *H02J 4/00* (2013.01)

(58) Field of Classification Search
USPC ........... 315/291, 361, 362; 361/160, 189, 190
See application file for complete search history.

(56) References Cited

U.S. PATENT DOCUMENTS

| | | | |
|---|---|---|---|
| 5,272,399 A | 12/1993 | Tihanyi et al. | |
| 5,909,660 A | 6/1999 | Foote | |
| 6,331,794 B1 | 12/2001 | Blanchard | |
| 6,504,424 B1 | 1/2003 | Heminger et al. | |
| 6,597,133 B2 * | 7/2003 | Hudson | 315/360 |
| 7,183,672 B2 | 2/2007 | Lewis | |
| 8,116,120 B2 | 2/2012 | Lin | |
| 8,537,021 B1 * | 9/2013 | Gordin et al. | 340/635 |
| 2009/0080133 A1 | 3/2009 | Chaudhuri et al. | |
| 2011/0193496 A1 * | 8/2011 | Finch | 315/307 |
| 2011/0193497 A1 * | 8/2011 | Finch | 315/307 |
| 2014/0062585 A1 | 3/2014 | Weis | |
| 2014/0084801 A1 | 3/2014 | Lys | |

* cited by examiner

*Primary Examiner* — Thuy Vinh Tran
(74) *Attorney, Agent, or Firm* — General Electric Company

(57) ABSTRACT

Lighting control systems, control modules for contactors, and methods of operating a lighting control system are described. In one example, a control module for a lighting contactor includes a controller, a power supply, and a control mode selector. The controller is configured to control operation of a lighting contactor in response to at least one control signal. The controller is selectively operable in a plurality of control modes. The power supply is configured to receive the at least one control signal and provide power to the controller. The control mode selector is coupled to the controller and operable to operate the controller in a selected control mode of the plurality of control modes.

17 Claims, 13 Drawing Sheets

FIELD SELECTABLE CONTACTOR CONTROL MODULES

BACKGROUND

The present application relates generally to contactor control modules and, more particularly, to field selectable control modules for lighting contactors in a lighting control system.

Known lighting systems use control signal voltages that may be alternating current (AC) or direct current (DC). The control signal voltages typically vary in magnitude between 10 volts and 277 volts. Components for use with lighting systems are often specifically tailored for a particular magnitude of either AC or DC voltage.

Known lighting systems also use different control schemes for indicating when a light should be turned on or off. For example, some known systems use a two wire control scheme, while other known systems use a three wire control scheme. Lighting system control components are often specifically configured to work with a particular control scheme.

The combination of multiple possible voltages and multiple possible control schemes often results in multiple configurations of the same component being manufactured and stored to ensure that lighting system components are available for all possible combinations of control signal voltage and control scheme.

BRIEF DESCRIPTION

In one aspect, a control module for a lighting contactor includes a controller, a power supply, and a control mode selector. The controller is configured to control operation of a lighting contactor in response to at least one control signal. The controller is selectively operable in a plurality of control modes. The power supply is configured to receive the at least one control signal and provide power to the controller. The control mode selector is coupled to the controller and operable to operate the controller in a selected control mode of the plurality of control modes.

In another aspect, a control module for a contactor module includes a controller and a power supply. The controller is configured to selectively open and close a contact in the contactor module in response to at least one control signal. The power supply is configured to receive the at least one control signal and provide power to the controller. The power supply is operable with alternating current control signals and direct current control signals. The power supply includes a first stage and a second stage. The at least one control signal is input to the power supply first stage, an output of the power supply first stage is coupled to an input of the power supply second stage, and an output of the power supply second stage is coupled to the controller.

In another aspect, a lighting contactor assembly includes a contactor module and a control module coupled to the contactor module. The contactor module includes a coil and a contactor. The control module is selectively operable for use with one of alternating current (AC) control signals and direct current (DC) control signals. The control module is selectively operable in a two wire control mode and a three wire control mode. The control module includes a controller configured to control operation of the contactor module in response to at least one control signal, and a power supply configured to receive the at least one control signal and provide power to said controller.

DETAILED DESCRIPTION

Exemplary embodiments of control modules for contactors are described. The contactors may be lighting contactors, motor contactors, or any other contactors. The exemplary control modules are configurable (also referred to herein as selectable) for use with alternating current (AC) or direct current (DC) control voltages. Moreover, the control modules are field selectable, e.g. selectable by a user of the control module before, during, and/or after installation. The control modules are also configurable for use with a two wire control scheme or a three wire control scheme. Moreover, the exemplary control modules are operable with a variety of magnitudes of AC and/or DC control voltages, obviating the need for different control modules for different control voltages. Specific examples of lighting control systems, control modules for lighting contactors in a lighting control system, and methods of operating a lighting control system are described. In other embodiments, the control modules are used with other types of contactors and/or in control systems for use in other (non-lighting) systems.

Figure 1:
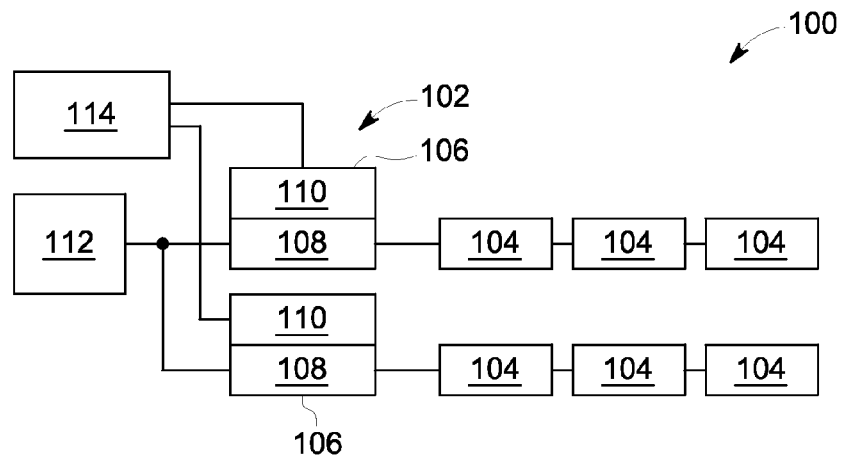
FIG. 1 is a schematic block diagram of a lighting system including a lighting control system.

FIG. 1 is a schematic block diagram of a lighting system 100 including a lighting control system 102. Lighting system 100 includes several lighting fixtures 104 under the control of lighting control system 102. The lighting fixtures 104 may be any suitable types of lighting fixtures 104, such as incandescent lighting fixtures, fluorescent lighting fixtures, halogen lighting fixtures, light emitting diode (LED) lighting fixtures, etc. Although two strings of three fixtures 104 each are shown in FIG. 1 the lighting system 100 may include any suitable number of strings of lighting fixtures 104, each including any suitable number of lighting fixtures 104. Moreover, lighting fixtures 104 may be connected together in series or in parallel.

An example lighting control system 102 includes two contactor assemblies 106. Each assembly 106 includes a contactor module 108 and a contactor controller module 110. Contactor module 108 is an electronically controlled switch that selectively couples power from a fixture power source 112 to lighting fixtures 104. Fixture power source 112 may be any suitable AC or DC power source for powering lighting fixtures 104. Contactor module 108 includes a contactor (not shown in FIG. 1) that opens and closes and at least one coil (not shown in FIG. 1) that, when energized, causes the contactor to move from an open position to a closed position or from the closed position to the open position. When the contactor is in the open position, contactor module 108 is an open switch that will not allow current to flow. Conversely, when the contactor is in the closed position, contactor module 108 is a closed switch that permits current to flow.

Contactor controller module 110 receives control signals from a control signal/power source 114 and controls operation of the contactor in response to the control signals. The control signals may be two wire control signals or three wire control signals. In an example two wire control scheme, the presence of a voltage difference between the two control wires (not shown) is a signal that the lighting fixture(s) coupled to that contactor assembly should be on, and the absence of a voltage difference (or a difference less than a threshold voltage) between the two wires is a signal that the lighting fixture(s) should be off. In an example three wire control scheme, the presence of a voltage difference between a first wire and a second wire of the three control wires is a signal that the lighting fixtures 104 should be on, while a voltage difference between the first wire and a third wire of the three control wires indicates that the lighting fixtures 104 coupled to that contactor assembly should be off.

Contactor controller module 110 is selectable between a two wire configuration and a three wire configuration. In an example embodiment, a switch (not shown in FIG. 1) is used to select the two wire or three wire configuration. Alternatively, an end-user selectable jumper wire, a dial, more than one switch, suitable programming, communications from another device (such as a remote controller), or any other suitable device or method for selecting the communication scheme may be used. The selection of the communication configuration informs contactor controller module 110 which communication scheme will be used so the controller module 110 can correctly interpret the received control signals and properly control the lighting fixtures 104 in response to the control signals. It should be understood that in some embodiments, the selection of the communication configuration may also couple one or more components, such as relays, filters, etc., in and/or out of the contactor controller module's circuit. Moreover, configuring contactor controller module 110 for a particular communication scheme will typically include at least some additional differences. For example, configuring contactor controller module 110 for three wire communication (rather than for two communication) will require connecting a third wire to contactor controller module 110, may involve connecting one or more of the communication wires to different terminal(s), and may involve connecting one or more auxiliary terminals to the controller module 110 or the contactor assembly 108.

Contactor controller module 110 is field selectable between an AC control voltage and a DC control voltage. In an example embodiment, a switch (not shown in FIG. 1) is used to select the AC or DC configuration. Alternatively, a jumper wire, a dial, more than one switch, suitable programming, communications from another device (such as a remote controller), or any other suitable device or method for selecting the communication scheme may be used. Moreover, in some embodiments, contactor controller module 110 configures itself for AC or DC control voltage by determining whether AC or DC control voltage is being used (as will be explained in more detail below). The control voltage may be a 24 volts DC, 24 volts AC, 120 volts AC, 277 volts AC, or any other suitable control voltage. In some embodiments, contactor controller module 110 is operable with DC control voltage having a magnitude between 10 volts and 300 volts. In other embodiments, contactor controller module 110 is operable with DC control voltage having a magnitude between about 10 volts and 100 volts. The contractor controller is operable with an AC voltage between about 18 volts and 277 volts. In other embodiments, contactor controller module 110 is operable with AC and/or DC control voltages within any other suitable range of voltages.

In an example embodiment, the control signals are provided to the contactor assemblies 106 via a manually operated, mechanical or electronic switch, such as a light switch. Alternatively, the control signals may be provided by a remote computing device (not shown), such as by the computing device actuating an electronic switch that couples the control signals to the contactor assemblies 106. In still other embodiments, the control signals may be provided, such as by a controller or other computing device, as higher frequency signals on a lower frequency power signal.

Figure 2:
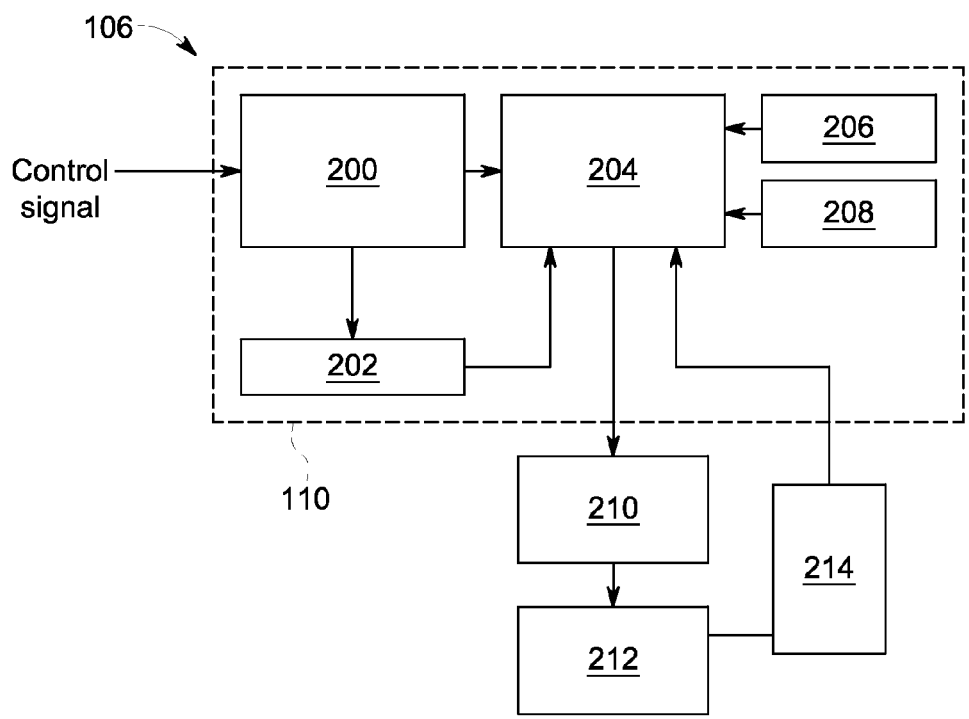
FIG. 2 is a block diagram of a contactor assembly.

FIG. 2 is a functional block diagram of one example contactor assembly 106. Contactor controller module 110 includes a power supply 200, a zero crossing circuit 202, a controller 204, a two wire/three wire selector 206 (also referred to as a control mode selector), and an AC/DC control signal selector 208 (also referred to as a control signal voltage selector). Contactor module 108 includes a contactor coil 210, a contact 212, and contactor status feedback 214.

The control signal is input to power supply 200. Power supply 200 provides a desired output voltage to the controller. The magnitude of the output voltage to controller 204 will typically be less than the magnitude of the control signal voltage. Power supply 200 also provides a signal (generally of a lesser magnitude than the control signal) to zero crossing circuit 202. Zero crossing circuit 202 provides a signal to controller 204 to allow controller 204 to determine when the magnitude of the control signal crosses zero. For a DC control signal the zero crossing indicates that the control signal has changed from zero volts to the magnitude of the DC control signal. An AC control signal crosses zero each time the signal changes polarity (from positive to negative and vice versa). The two wire/three wire selector and the AC/DC control signal selector configure controller 204 to operate with two or three wire control signals and with AC or DC control signals. When controller 204 determines, in response to the control signals, to open or close contact 212 (to turn the fixtures 104 off or on, respectively), controller 204 couples a current to contactor coil 210, which moves contact 212 to the desired position (open or closed). The current coupled to the contactor coil 210 by the controller 204 may be derived from the output of power supply 200, control signal/power source 114, fixture power source 112, or any other source of current suitable for driving contactor coil 210. The contact 212 latches in the open and closed positions so that current to coil 210 does not need to be maintained after contact 212 latches in position. Contactor feedback 214 informs controller 204 of the position of the contact 212. Thus, controller 204 is able to determine whether contact 212 is in the open position or in the closed position. Operation of contactor controller module 110 will be described in more detail below with reference to FIGS. 8A-8D.

Figure 3:
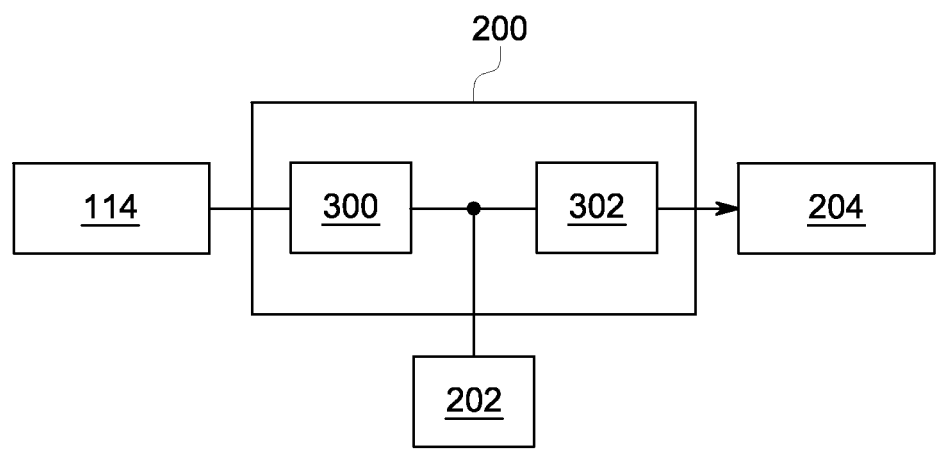
FIG. 3 is a block diagram of a power supply for use in a contactor controller module.

FIG. 3 is a block diagram of an example power supply 200 for use in contactor controller module 110. Power supply 200 is a two stage power supply that can handle AC control signals and DC control signals. A first stage 300 of power supply 200 is a voltage and current limiting stage. First stage 300 substantially limits the voltage to a predetermined maximum voltage and substantially limits the current input to power supply 200 to prevent a large inrush current and limit peak power consumed by contactor controller module 110. Any voltage below set maximum voltage is allowed to pass first stage 300 and any voltage at or exceeding the maximum voltage is clamped to the maximum voltage. First stage 300 of power supply 200 may be any suitable active or passive voltage and current limiting circuit. The second stage 302 of power supply 200 provides a regulated, substantially constant voltage output to controller 204. Second stage 302 of power supply 200 may include any suitable circuit for providing a substantially constant output voltage, including a linear regulator, a switch mode power supply, etc. Zero crossing circuit 202 is coupled to power supply 200 between first stage 300 and second stage 302. Zero crossing circuit 202 utilizes the limited voltage output of first stage 300 to detect zero crossings rather than the potentially higher voltage of the control signal, thereby allowing zero crossing circuit 202 to use lower power rated components than would be needed if the control signal were used directly.

Figure 4:
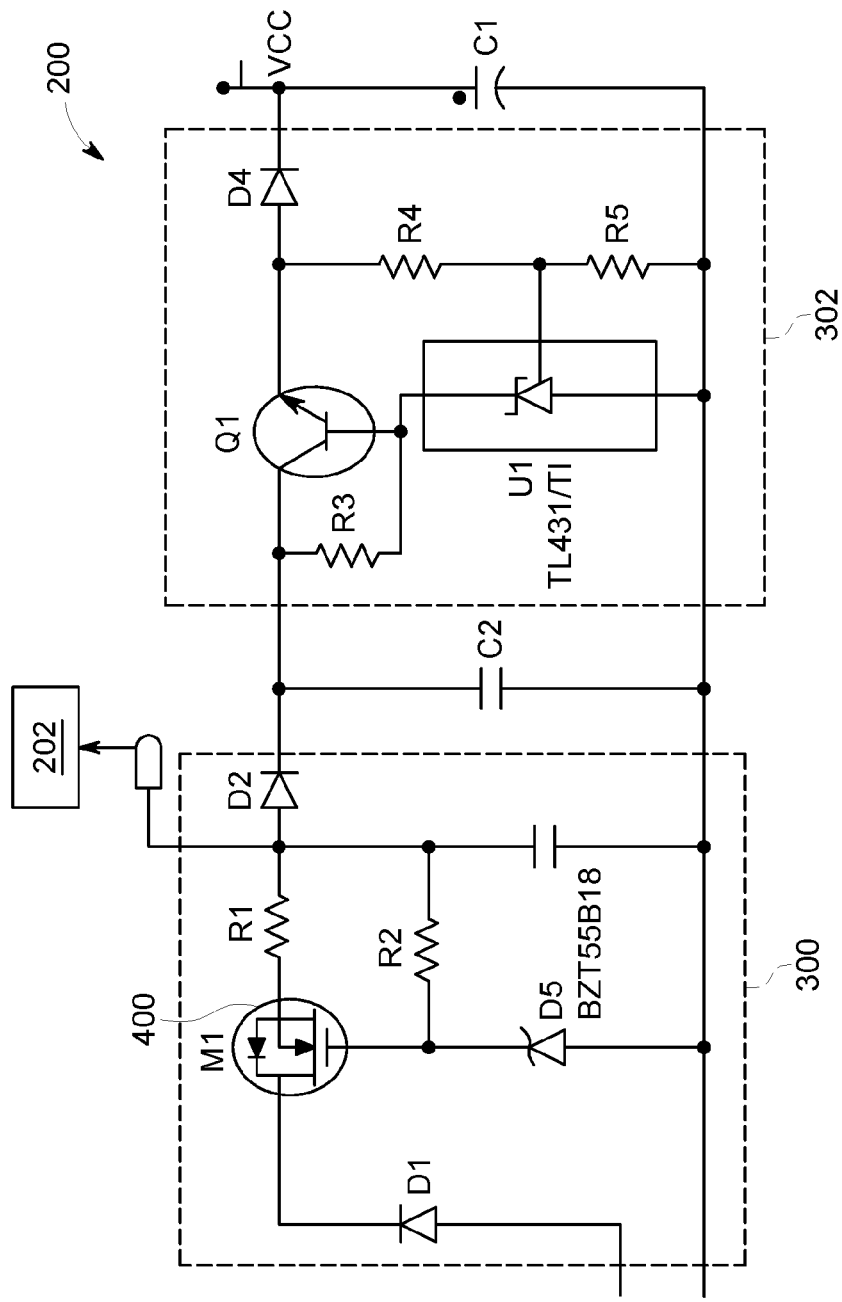
FIG. 4 is a schematic diagram of a power supply for use in the contactor controller module.

FIG. 4 is a schematic diagram of a power supply 200 for use in contactor controller module 110. First stage 300 includes a depletion mode MOSFET 400 that, in conjunction with resistor R1, limits the current through first stage 300. The use of a depletion mode MOSFET, rather than an enhancement mode MOSFET, permits the use of a bias voltage from the lower voltage portion of power supply 200 (e.g., between first stage 300 and second stage 302), thereby improving efficiency and allowing lower voltage rated components to be used in power supply 200. Moreover, depletion mode MOSFET 400 provides a voltage output from first stage 300 at startup of power supply 200 before a bias voltage is created. Zener diode Z1 limits the maximum voltage output by first stage 300. The example first stage 300 limits the current flow into first stage 300 when the control signal voltage exceeds a threshold value and allows the greatest amount of current to be drawn when the control signal voltage is lower than the threshold value. In the example embodiment, first stage 300 limits its output voltage to about 20 volts. When the control signal is a 110 volt AC control signal, first stage 300 limits the input current to about 1.9 mA. In some embodiments, first stage 300 limits the input current to about 7 mA.

Figure 5A:
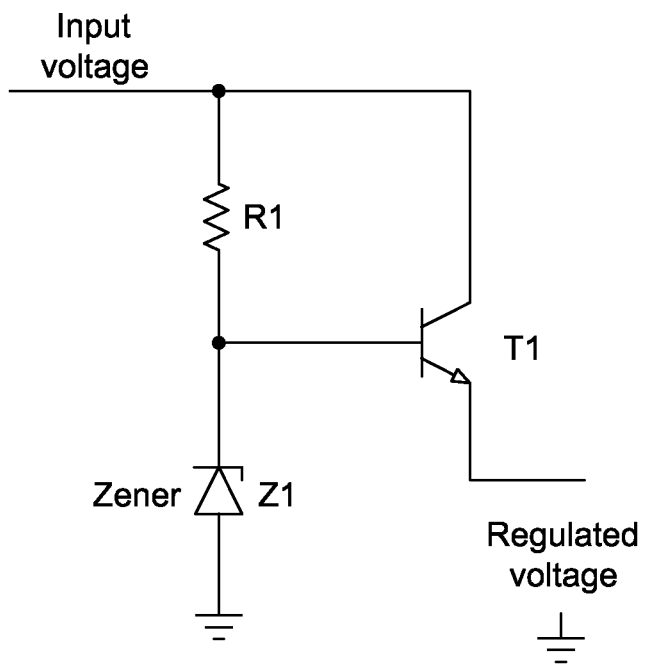
FIGS. 5A and 5B are two example linear regulator circuits that may be used as a second stage of the power supply.
Figure 5B:
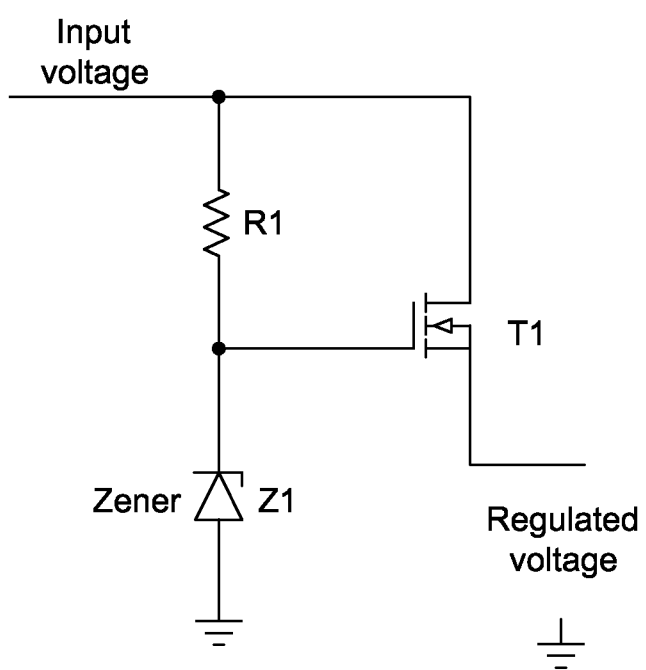
Figure 6:
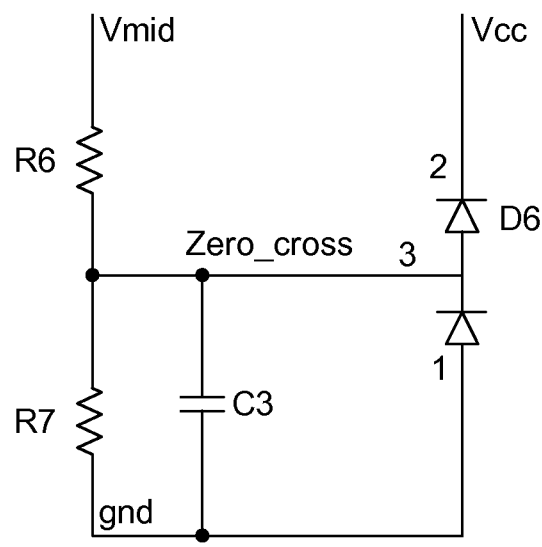
FIG. 6 is an example circuit suitable for use as a zero cross circuit in the contactor controller module.

Second stage 302 of power supply 200 includes a linear regulator. Second stage 302 receives the output of first stage 300 as its input and outputs a reduced voltage at a substantially constant value. In the example embodiments, the output of second stage 302 is about five volts DC (regardless of the control signal magnitude and whether the control signal is and AC or DC control signal). FIGS. 5A and 5B are two example linear regulator circuits that may be used in second stage 302 of power supply 200. FIG. 6 is an example circuit suitable for use as the zero crossing circuit 202 in contactor controller module 110. In other embodiments, any other circuit suitable for detecting a zero crossing may be used.

Figure 7A:
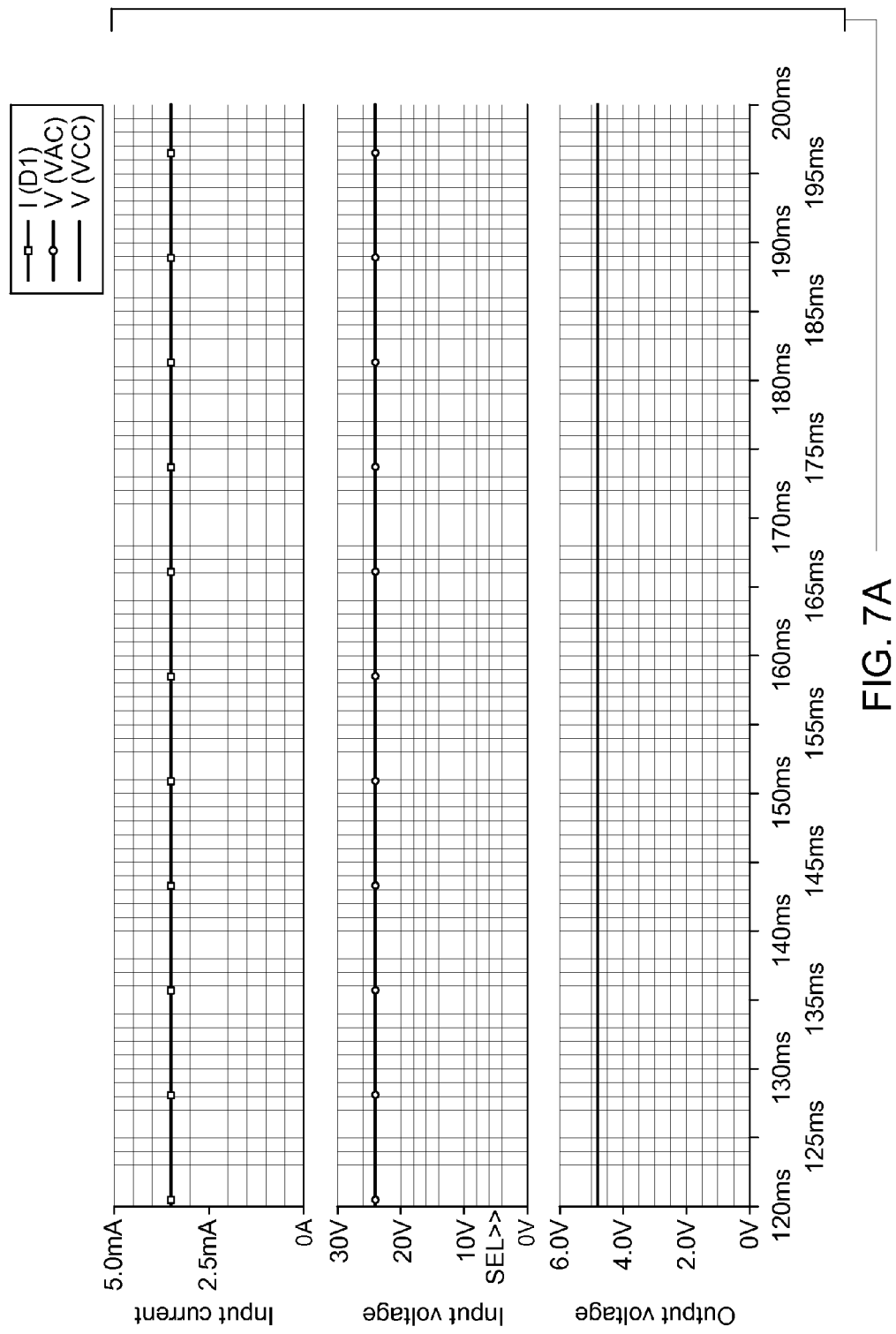
FIGS. 7A-7D are waveforms of simulations of the power supply circuit shown in FIG. 4.
Figure 7B:
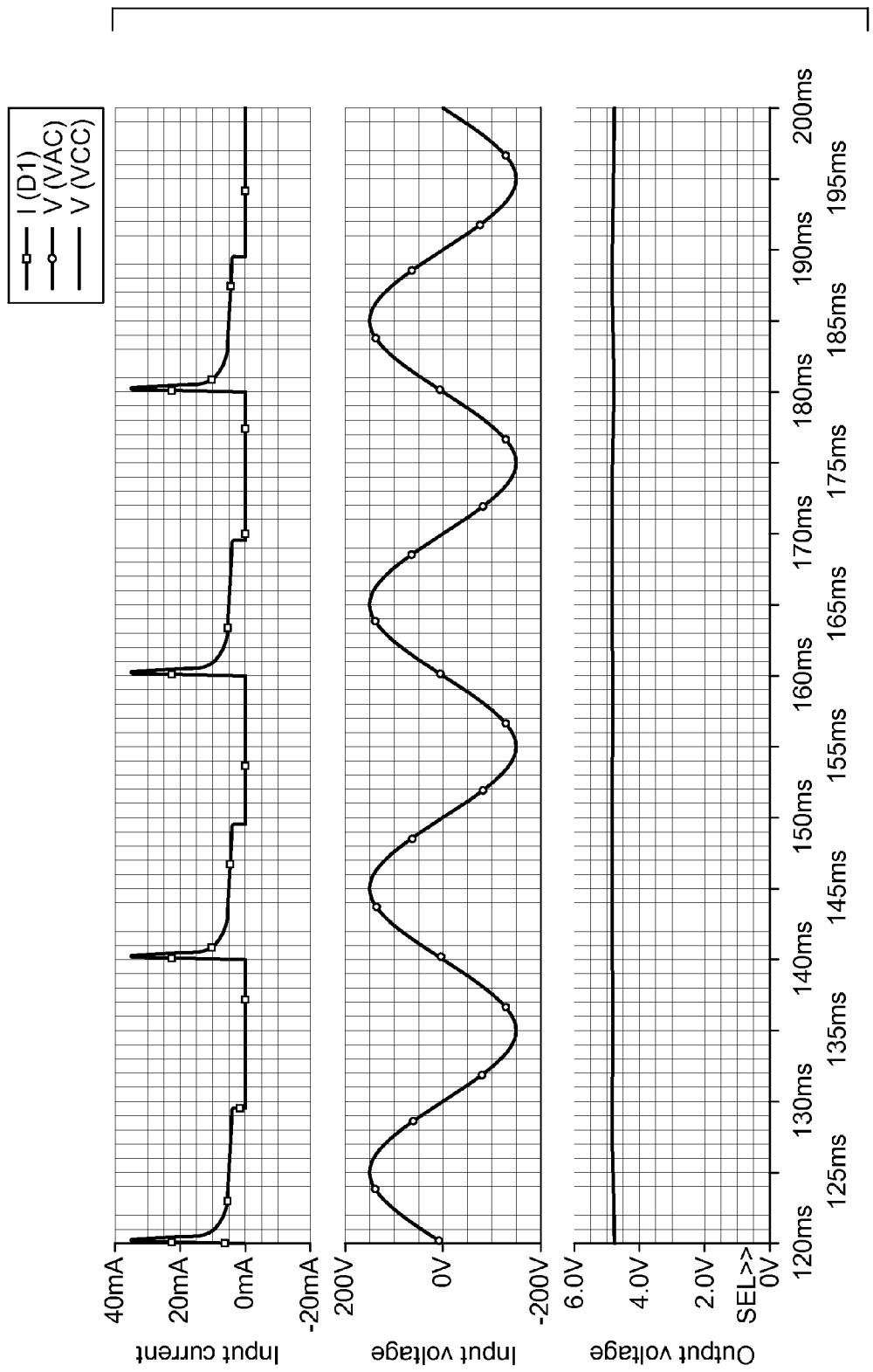
Figure 7C:
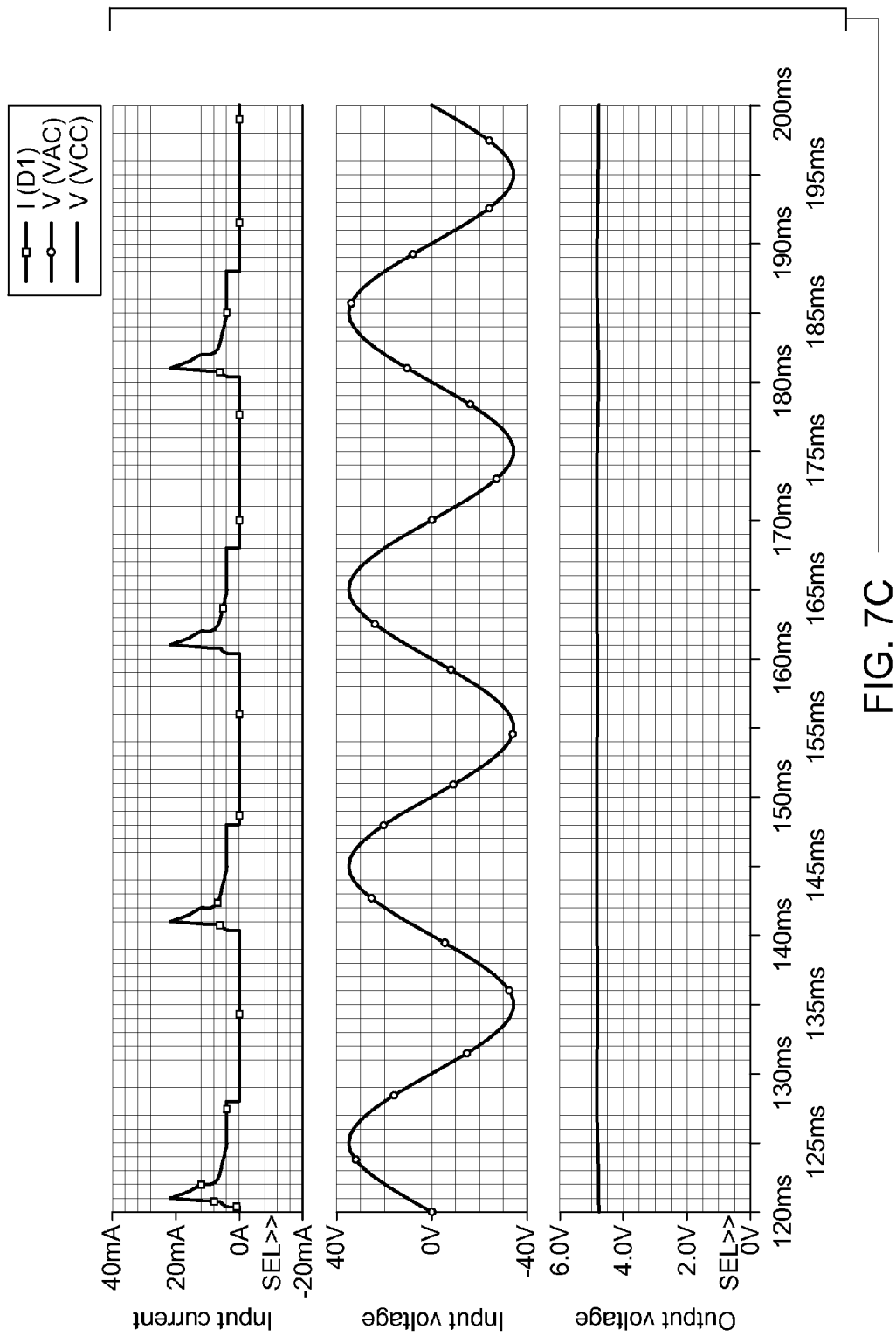
Figure 7D:
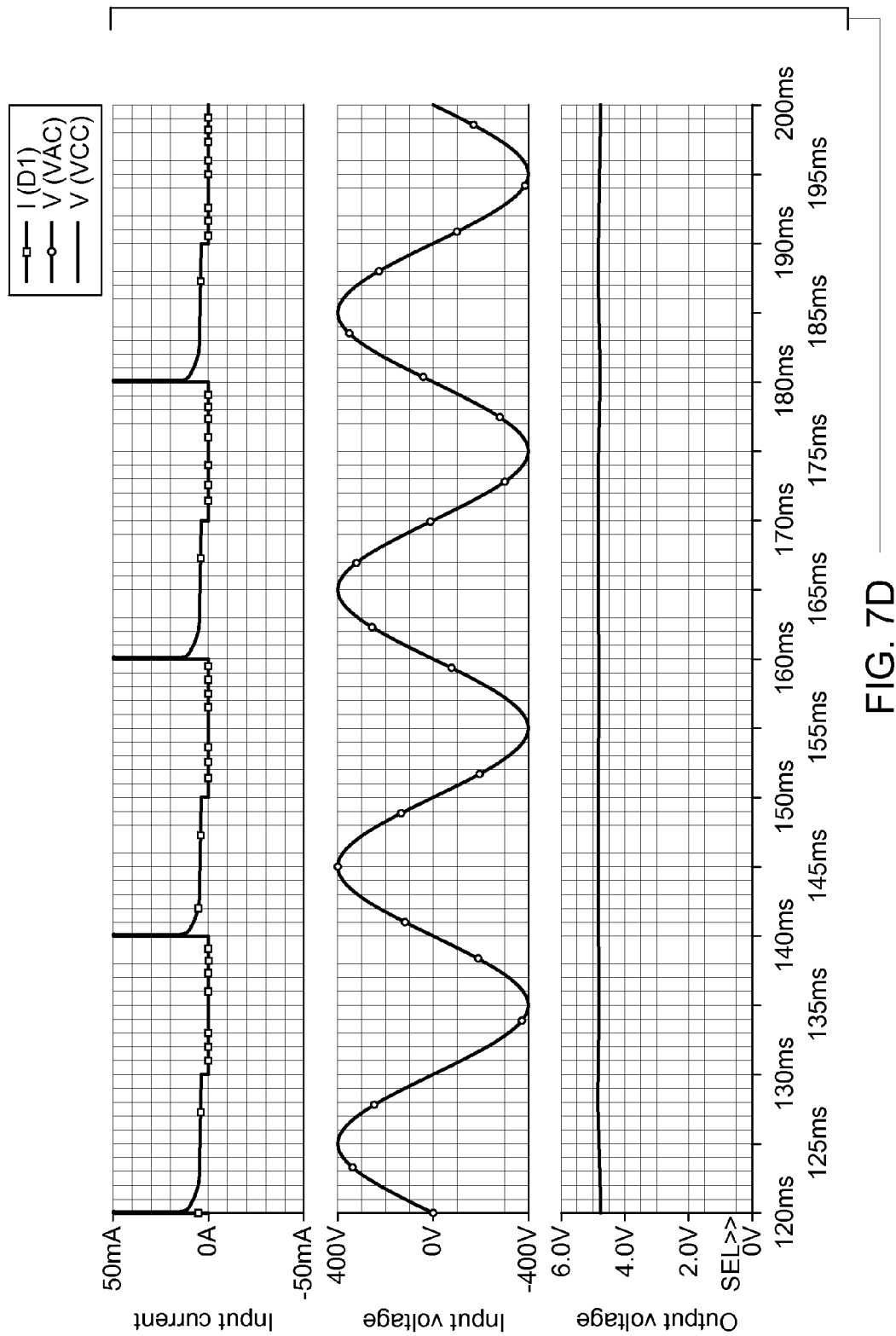

FIGS. 7A-7D are waveforms of simulations of power supply 200 circuit shown in FIG. 4. FIG. 7A graphs the input current, input voltage, and output voltage of power supply 200 when the control signal is a 24 volt direct current (VDC) signal. FIG. 7B presents the input current, input voltage, and output voltage of power supply 200 when the control signal is a 110 volt alternating current (VAC) signal. FIG. 7C is a graph of the input current, input voltage, and output voltage of power supply 200 when the control signal is a 24 VAC signal. FIG. 7D is a graph of the input current, input voltage, and output voltage of power supply 200 when the control signal is a 277 VAC signal.

Figure 8A:
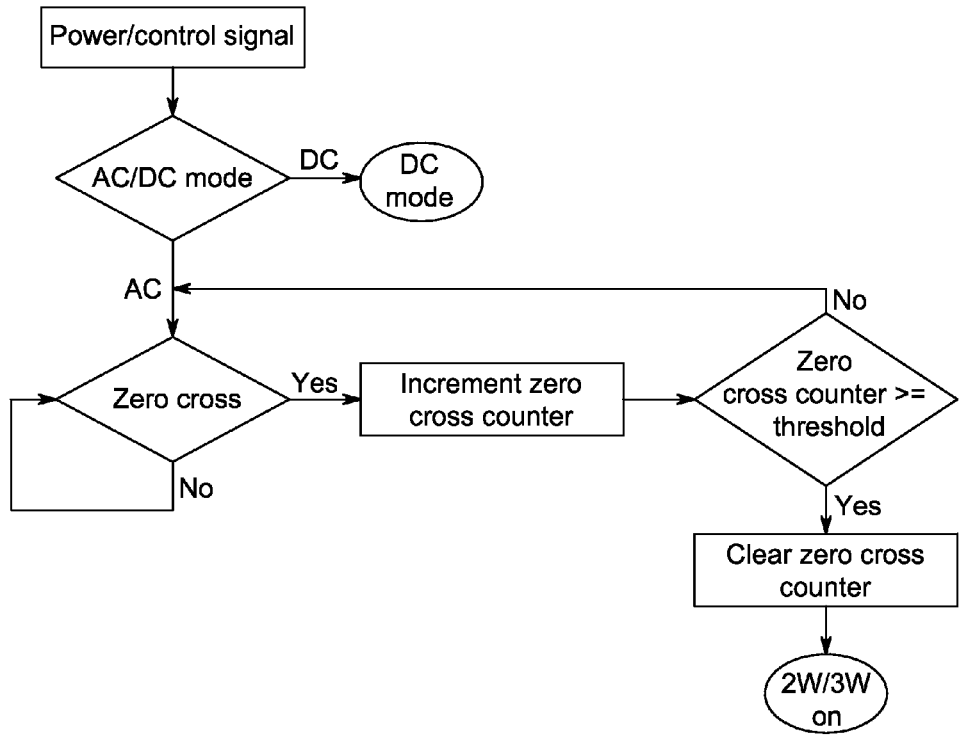
FIGS. 8A-8D are a flow chart of an example method for control of the contactor assembly by the controller.
Figure 8B:
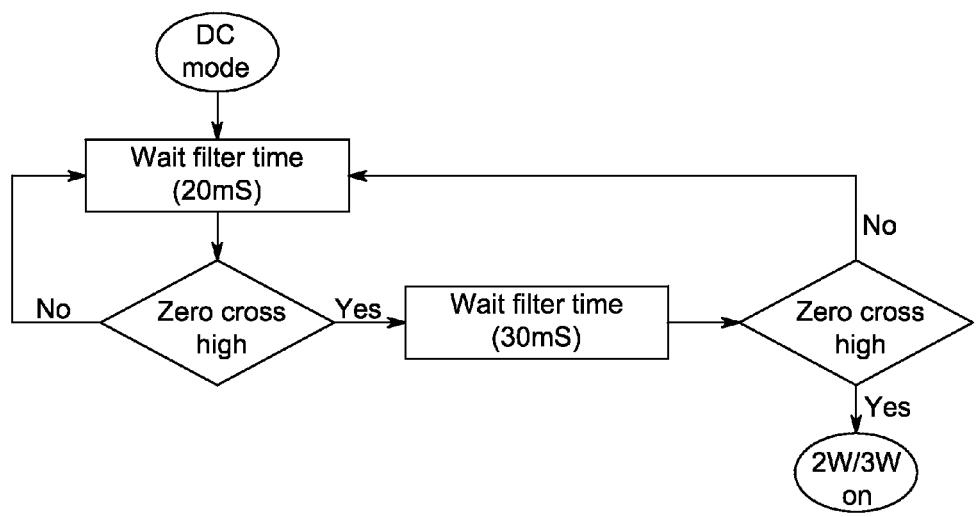

FIGS. 8A-8D are a flow chart of an example method for control of contactor assembly 106 by controller 204. In FIG. 8A, controller 204 determines, based on the AC/DC selection, whether AC or DC control is selected for the control module. If the DC mode is selected, the method continues to FIG. 8B. If the AC mode is set, controller 204 looks for zero crossing detections (which indicate that an AC signal is present) and increments a counter when one occurs. When the zero crossing counter reaches or exceeds a threshold, controller 204 resets that counter and proceeds to FIG. 8C. Turning first to FIG. 8B, if the DC mode was set, controller 204 looks for a high signal from the zero crossing circuit 202 (indicating that the input is not zero and a DC signal is present). Controller 204 checks again for the high signal after a waiting period to reduce the chances of noise being detected as a DC signal. If the zero crossing is still high, the method proceeds to FIG. 8C.

Figure 8C:
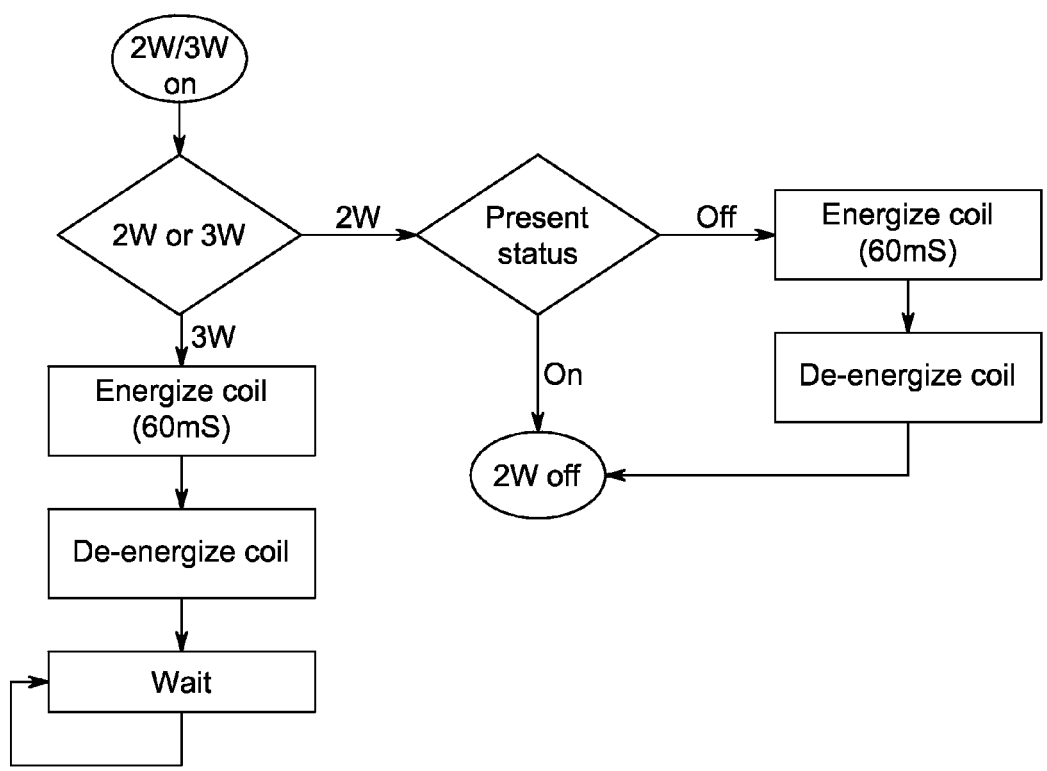
Figure 8D:
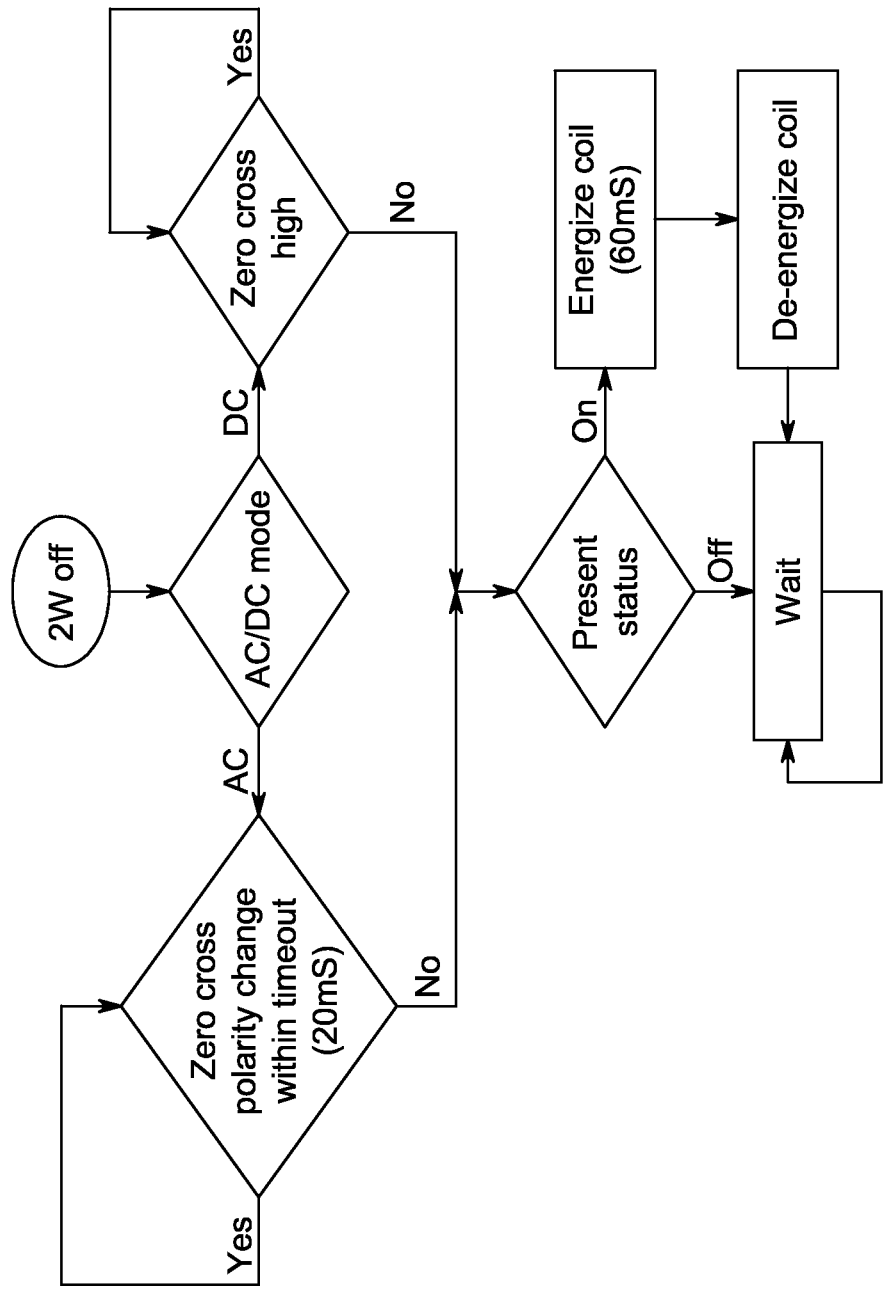

In FIG. 8C, controller 204 determines, based on the two wire/three wire selection, whether two wire control or three wire control is selected for the control module. If three wire control is selected, controller 204 energizes the contactor coil for a sufficient time to change the position of the contact, and then waits. If the two wire control is selected, controller 204 checks the contactor feedback to determine the current status of the contact. If the contact is already in the closed (on) position, controller 204 does not need to close the contact and the method proceeds to FIG. 8D. If the contact is in the open (off) position, controller 204 energizes the coil to close the contact and the method proceeds to FIG. 8D. If the control module is set for two wire AC control, controller 204 looks for the lack of an AC signal by looking for a timeout period without a zero crossing. When controller 204 no longer detects the AC signal, it checks the current status of the contact and opens it if it is currently on (closed). If the control module is set for two wire DC control, controller 204 looks for the lack of a DC signal by looking for zero crossing circuit 202 to stop outputting a high signal. When controller 204 no longer detects the DC signal, it checks the current status of the contact and opens it if it is currently on (closed). Three wire AC control mode sends a different signal (on the third wire) that is detected by controller 204 and causes controller 204 to turn off (open) the contact in the same way described above for the three wire AC turn on signal.

Figure 9:
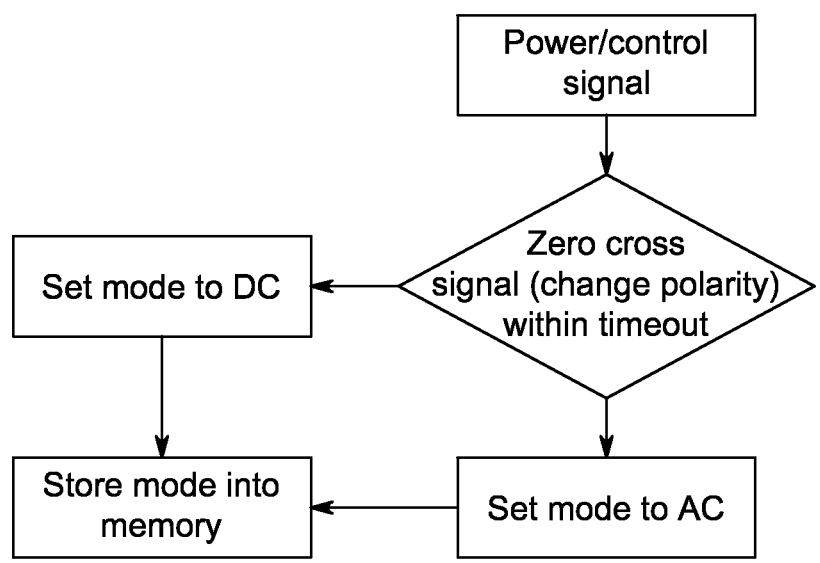
FIG. 9 is a flowchart of a method for automatically detecting whether the control signal is an AC signal or a DC signal.

FIG. 9 is a flowchart of a method for use by controller module 110 for automatically detecting whether the control signal is an AC signal or a DC signal. Embodiments of the contactor controller module 110 that incorporate this method are capable of self-selecting AC control mode or DC control mode and storing the selection in a memory device (not shown). Controller 204 looks for a zero crossing signal (which would indicate an AC signal being present) to occur within a timeout period. The timeout period is set to be longer than half of a period of an AC signal at the frequency or frequencies that may be encountered. If a zero crossing is not detected within the timeout period, an AC control signal is not present and the control mode is selected to be the DC control mode. In other embodiments, the timeout period is set to about the length of a period of the possible AC signal to provide an additional opportunity to detect a zero crossing.

Exemplary embodiments of lighting systems, contactor controllers, and methods of a lighting system are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the power system as described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control module for a contactor comprising:
   a controller configured to:
      control operation of the contactor in response to at least one control signal, said controller selectively operable in a plurality of control modes;
      determine whether the received at least one control signal includes an alternating current (AC) control signal or a direct current (DC) control signal; and
      store the determination;
   a power supply configured to receive the at least one control signal and provide power to said controller; and
   a control mode selector coupled to said controller, said control mode selector operable to operate said controller in a selected control mode of the plurality of control modes.

2. A control module in accordance with claim 1, wherein said control mode selector is operable to operate said controller in a control mode selected from a two wire control mode and a three wire control mode.

3. A control module in accordance with claim 1, further comprising a control signal voltage selector coupled to said controller, said control signal voltage selector operable to operate said controller with a selected control voltage.

4. A control module in accordance with claim 3, wherein said control signal voltage selector is operable to operate said controller with a control voltage selected from an alternating current (AC) control signal voltage and a direct current (DC) control signal voltage.

5. A control module in accordance with claim 4, wherein said power supply is arranged to operate with AC control signals between about 18 volts AC and about 277 volts AC and DC control signals between about 10 volts DC and 300 volts DC.

6. A control module in accordance with claim 1, further comprising a zero crossing detector coupled to said power supply, wherein said controller is configured to determine whether the at least one control signal includes an AC control signal or a DC control signal based at least in part on an output of said zero crossing detector.

7. A control module for use with a contactor module, said control module comprising:
   a controller configured to:
      selectively open and close a contact in the contactor module in response to at least one control signal, said controller selectively operable in one of a plurality of control modes;
      determine whether the at least one control signal includes an alternating current (AC) control signal or a direct current (DC) control signal; and
      store the determination; and
   a power supply configured to receive the at least one control signal and provide power to said controller, said power supply operable with AC control signals and DC control signals, said power supply comprising a first stage and a second stage, wherein the at least one control signal is input to said power supply first stage, an output of said power supply first stage is coupled to an input of said power supply second stage, and an output of said power supply second stage is coupled to said controller.

8. A control module in accordance with claim 7, wherein said power supply first stage comprises a voltage limiter and a current limiting circuit.

9. A control module in accordance with claim 8, wherein said current limiting circuit comprises a depletion mode metal oxide semiconductor field effect transistor (MOSFET).

10. A control module in accordance with claim 8, wherein said power supply second stage comprises one of a linear voltage regulator and a switching power supply.

11. A control module in accordance with claim 10, further comprising a control mode selector coupled to said controller, wherein said control mode selector is operable to operate said controller in a control mode selected from a two wire control mode and a three wire control mode.

12. A control module in accordance with claim 11, further comprising a control signal voltage selector coupled to said controller, said control signal voltage selector operable to operate said controller with a control signal voltage selected from an AC voltage and a DC voltage.

13. A control module in accordance with claim 7, further comprising a zero crossing detector coupled between said power supply first stage and said power supply second stage.

14. A lighting contactor assembly comprising:
   a contactor module including a coil and a contact; and
   a control module coupled to said contactor module, said control module selectively operable for use with one of alternating current (AC) control signals and direct current (DC) control signals, and selectively operable in a two wire control mode and a three wire control mode, said control module comprising:
      a controller configured to:
         control operation of said contactor module in response to at least one control signal;
         detect whether the at least one control signal includes an AC control signal or a DC control signal; and
         select between operation with AC control signals and operation with DC control signals based at least in part on the detection; and
      a power supply configured to receive the at least one control signal and provide power to said controller.

15. A lighting contactor assembly in accordance with claim 14, wherein said control module further comprises a control mode selector coupled to said controller, said control mode selector operable to operate said controller in a control mode selected from the two wire control mode and the three wire control mode.

16. A lighting contactor assembly in accordance with claim 15, wherein said control module further comprises a control signal voltage selector coupled to said controller, said control signal voltage selector operable to operate said controller with one of AC control signals and DC control signals.

17. A lighting contactor assembly in accordance with claim 14, wherein said power supply comprises a first stage and a second stage, said power supply first stage comprises a voltage limiter and a current limiting circuit, and said power supply second stage comprises one of a linear voltage regulator and a switching power supply.

* * * * *